(12) United States Patent
Roth et al.

(10) Patent No.: US 7,073,953 B2
(45) Date of Patent: Jul. 11, 2006

(54) MODULAR FIBER OPTIC CONNECTION SYSTEM

(75) Inventors: Richard F. Roth, Brookline, NH (US); Sepehr Kiani, Watertown, MA (US)

(73) Assignee: Amphenol Corporation, Wallingford, CT (US)

( * ) Notice: Subject to any disclaimer, the term of this patent is extended or adjusted under 35 U.S.C. 154(b) by 181 days.

(21) Appl. No.: 10/195,960

(22) Filed: Jul. 16, 2002

(65) Prior Publication Data

US 2003/0044127 A1 Mar. 6, 2003

Related U.S. Application Data

(60) Provisional application No. 60/316,594, filed on Aug. 31, 2001.

(51) Int. Cl.
*G02B 6/36* (2006.01)
*G02B 6/42* (2006.01)

(52) U.S. Cl. .............................. 385/88; 385/53; 385/56; 385/59; 385/89

(58) Field of Classification Search ................... 385/53, 385/56, 58, 59, 88–89
See application file for complete search history.

(56) References Cited

U.S. PATENT DOCUMENTS

| | | | |
|---|---|---|---|
| 4,820,169 A | 4/1989 | Weber et al. | 439/65 |
| 4,881,792 A | 11/1989 | Alameel et al. | 350/96.2 |
| 5,121,454 A * | 6/1992 | Iwano et al. | 385/60 |
| 5,125,056 A | 6/1992 | Hughes et al. | 385/59 |
| 5,134,679 A | 7/1992 | Robin et al. | 385/90 |
| 5,245,683 A | 9/1993 | Belenkiy et al. | 385/72 |
| 5,506,922 A | 4/1996 | Grois et al. | 385/75 |
| 5,778,121 A | 7/1998 | Hyzin | 385/55 |
| 5,883,995 A | 3/1999 | Lu | 385/60 |

(Continued)

FOREIGN PATENT DOCUMENTS

| | | |
|---|---|---|
| DE | 29708275 | 7/1997 |
| DE | 19608500 | 9/1997 |
| EP | 0330231 | 8/1989 |
| EP | 0475846 | 3/1992 |

OTHER PUBLICATIONS

3M International Solutions, "Daughter Card and Backplane Couplings –OGI Series", Nov. 21, 2002.
Diamond SA. "Diamond Fiber Optic Components".

*Primary Examiner*—Sung Pak
*Assistant Examiner*—Omar Rojas
(74) *Attorney, Agent, or Firm*—Blank Rome LLP

(57) ABSTRACT

In one embodiment of a fiber optic connection system of the present invention, there is provided a first fiber optic connector attachable to a first printed circuit board and a second fiber optic connector attachable to a second printed circuit board and mateable to the first fiber optic connector. The first fiber optic connector has separable first wafer modules, each of which hold at least one optical fiber, and separable first latching modules removably attached to the separable first wafer modules. The second fiber optic connector includes separable second wafer modules, each of which hold at least one optical fiber, and separable second latching modules removably attached to the separable second wafer modules. The separable second latching modules are engageable to the separable first latching modules to mate the first and second fiber optic connectors. Although not required, the fiber optic connection system can also include a first module carrier, to which is attachable the separable first wafer modules and the separable first latching modules, and a second module carrier, to which is attachable the separable second wafer modules and the separable second latching modules.

20 Claims, 8 Drawing Sheets

U.S. PATENT DOCUMENTS

| | | | |
|---|---|---|---|
| 5,909,526 A | 6/1999 | Roth et al. | 385/78 |
| 5,915,058 A | 6/1999 | Clairardin et al. | 385/77 |
| 5,930,426 A | 7/1999 | Harting et al. | 385/56 |
| 5,956,444 A | 9/1999 | Duda et al. | 385/53 |
| 5,960,138 A | 9/1999 | Shimoji et al. | 385/58 |
| 6,076,975 A | 6/2000 | Roth | 385/76 |
| 6,079,881 A | 6/2000 | Roth | 385/76 |
| 6,135,644 A | 10/2000 | Hakogi et al. | 385/92 |
| 6,154,597 A | 11/2000 | Roth | 385/139 |
| 6,240,228 B1 | 5/2001 | Chen et al. | 385/53 |
| 6,276,839 B1 | 8/2001 | De Marchi | 385/53 |
| 6,331,079 B1 | 12/2001 | Grois et al. | 385/53 |
| 6,361,218 B1 * | 3/2002 | Matasek et al. | 385/60 |
| 6,364,536 B1 | 4/2002 | Chen et al. | 385/59 |
| 6,406,192 B1 | 6/2002 | Chen et al. | 385/56 |
| 6,412,986 B1 * | 7/2002 | Ngo et al. | 385/53 |
| 6,419,399 B1 | 7/2002 | Loder et al. | 385/53 |
| 6,422,760 B1 | 7/2002 | Matasek et al. | 385/60 |
| 6,425,692 B1 | 7/2002 | Fujiwara et al. | 385/56 |
| 6,461,053 B1 * | 10/2002 | Mayercik et al. | 385/56 |
| 6,832,858 B1 * | 12/2004 | Roth et al. | 385/71 |
| 2002/0006253 A1 | 1/2002 | Marchi | 385/88 |

* cited by examiner

MODULAR FIBER OPTIC CONNECTION SYSTEM

CROSS-REFERENCE TO RELATED APPLICATION

This application claims priority of earlier filed U.S. Provisional Application Ser. No. 60/316,594, filed Aug. 31, 2001, entitled, "Connector Design Accommodating Variable Wipe Length While Minimizing Potential Optical Fiber Misalignment".

BACKGROUND OF THE INVENTION

Traditional high speed computer and communications systems are often built using a backplane assembly. Such systems are built on several printed circuit boards ("PCB"), called "daughter boards" or "daughter cards", that are interconnected through a backplane.

A traditional backplane is a printed circuit board that has many signal traces running through it. The traces route signals between electrical connectors mounted on a surface of the backplane. The daughter cards have mating electrical connectors along one edge, allowing each daughter card to be plugged into the backplane. In this configuration, the daughter cards are parallel to each other and mounted typically at right angles to the backplane.

As the need for bandwidth in our technological society has increased, it is evident that existing communications systems will not have the capacity to provide the desired bandwidth. Thus, high-speed systems must be developed which use light to transmit data signals, in addition to the existing electrical communication architecture. Data can then be transmitted at very high rates (e.g., 10 gigabits per second). Instead of metal traces, such systems use optical fiber or waveguides to transmit the light.

It should be realized that optical communications is not like electronic communications. Light is an electromagnetic radiation having unique characteristics that are different from the characteristics of electrons. Therefore, designing a backplane assembly for light transmission has different considerations from designing a backplane assembly for electronic transmission.

A backplane assembly designed for light transmission generally includes connectors that have a ferrule holding a single optical fiber or a multi-fiber optical ribbon. The ferrule on the daughter card connector is mated with a corresponding ferrule on the backplane connector so that the optical fibers held in the mating ferrules are aligned to minimize loss. These ferrules are conventionally placed in the mating position by alignment pins and passages for receiving the alignment pins.

Due to the size of the optical fibers utilized, for example 125 micron ($10^{-6}$ meter) diameter with a 62.5 micron diameter core, it is critical to maintain precise tolerances with the alignment pins and the receiving passages. Failure to maintain precise tolerances and any other misalignment/defect could lead to significant loss of data signals at the fiber-to-fiber interface.

As more and more backplane assemblies incorporate both electrical connectors and fiber optic connectors, the above alignment/tolerance problems are further complicated by the need for the backplane assembly to accommodate variable wipe length. As used herein, "wipe length" refers to the distance required for the electrical connectors on the daughter card and backplane to establish electrical engagement. Typically, the electrical connectors are mounted on the edge of the daughter card often near the optical connectors.

This "wipe" is required primarily to counteract accumulated tolerances within the backplane/daughter card enclosure. Factors such as PCB uniformity, planarity, positional tolerancing, PCB lock location, component tolerancing and connector binding, all play roles in the final position of the electrical connectors in relation to the PCBs. These same factors can be detrimental to fiber optic connectors.

Fiber optic connectors function as butt-coupled devices. The end faces holding the optical fibers must remain in physical contact at all times to ensure that the optical signals traveling in the optical fibers are stable and uninterrupted. Therefore, fiber optic connectors must be designed to establish full engagement and provide "float" (movability in the axis of engagement) to accommodate the variable wipe of the electrical connectors. There are two main reasons for this.

First, mating forces in excess of 150 lbs. can be generated when joining high-density electrical connectors. Manual cam latch mechanisms are conventionally used to join the individual daughter cards to the backplane. These mechanisms, although manually operated, do not provide much user feedback other than a go or no-go type situation. With this being the case, if any connector is not properly aligned under such loads, then there is a strong likelihood of problems for the connection system. Therefore, it is critical that individual connectors are aligned before the latches are engaged. Furthermore, it is desirable to isolate mating force spikes by staggering the mating sequence from optical to electrical. This will provide for smoother cam latch activation when attempting to seat the daughter card on the backplane. Also, any additional loads that could bring the latches beyond their elastic limit are removed.

Second, in order to accommodate different electrical connectors and to have a product that is easily leveraged into new technologies, it is important to maximize the float to ensure compatibility and limit the possibility of conjoined future force spikes. For these characteristics to be provided, reasonably large Z-axis travel (here, the Z-axis has been selected as the axis of engagement), for example on the order of 3 to 7 millimeters, is desired. This requires that the fiber optic connectors and the electrical connectors move in relation to one another; otherwise, components would be damaged or destroyed under the force of lever arms for engaging daughter cards to the backplane.

To achieve the desired float, a slidable mechanism is typically employed within the system. For example, a prior art system disclosed in U.S. Pat. No. 5,121,454 issued to Iwano et al. utilizes side latches incorporated into the connector housing for mating, and the configuration of the latches and the connector housing provide float in the Z-direction. The latching approach of the prior art '454 patent is described in more detail with respect to FIG. 1 in the Detailed Description section.

The inventors of the present invention have recognized that while prior art fiber optic connection systems function adequately for the most part, there are disadvantages that have not been addressed by the prior art systems. First, the prior art systems known to the inventors do not provide design flexibility. For example, as the number of optical fibers or other requirements in a connector changes, there is a need to retool and redefine the design to satisfy such requirements. And this retooling/redefinition process is costly and time consuming. Referring back to the fiber optic connector disclosed in the prior art '454 patent, it is apparent to one of ordinary skill in the art that should the connector requirements change (e.g., requiring more optical fibers to be held by the connector), the connector design will have to be redefined and substantial retooling will be necessary.

Second, because of the substantial mating forces present, the prior art systems employ complex latch/release mechanisms which tend to increase the size and material cost of the connection system. More importantly, perhaps, this increased size of the connection system occupies valuable space on the printed circuit board—which space could have been utilized by other components.

What is desired, therefore, is a fiber optic connection system that addresses these disadvantages of prior art systems by providing for design flexibility in a cost-effective, time saving manner.

SUMMARY OF THE INVENTION

One embodiment of a fiber optic connection system of the present invention includes a first fiber optic connector attachable to a first printed circuit board and a second fiber optic connector attachable to a second printed circuit board and mateable to the first fiber optic connector. The first fiber optic connector has separable first wafer modules, each of which hold at least one optical fiber, and separable first latching modules removably attached to the separable first wafer modules. The second fiber optic connector includes separable second wafer modules, each of which hold at least one optical fiber, and separable second latching modules removably attached to the separable second wafer modules. The separable second latching modules are engageable to the separable first latching modules to mate the first and second fiber optic connectors. Although not required, the fiber optic connection system can also include a first module carrier, to which is attachable the separable first wafer modules and the separable first latching modules, and a second module carrier, to which is attachable the separable second wafer modules and the separable second latching modules.

DETAILED DESCRIPTION OF THE PREFERRED EMBODIMENT

Figure 1:
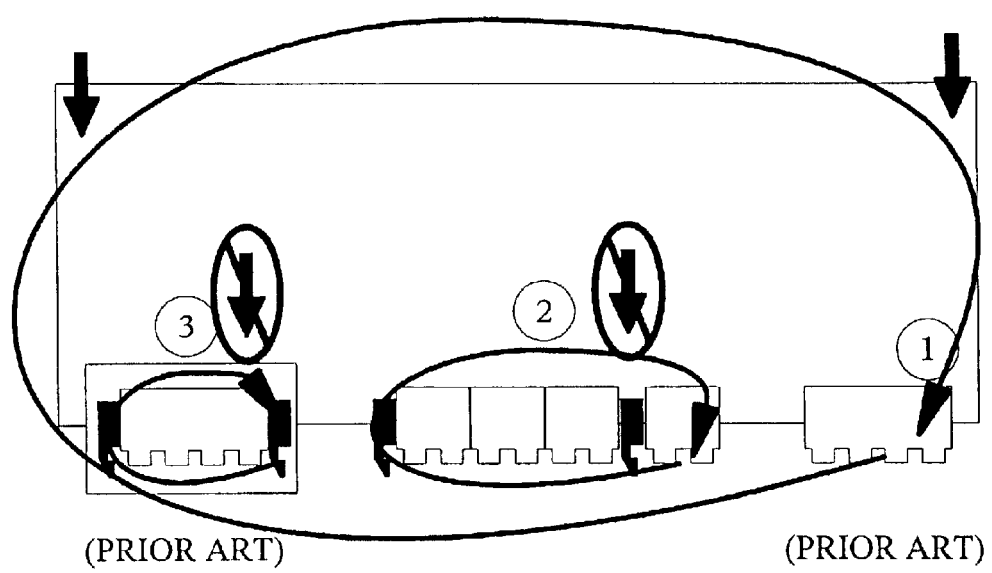
FIG. 1 is a schematic illustration of three different configurations for a fiber optic connection system, where options 1 and 3 depict prior art configurations and option 2 depicts the configuration of the present invention.

FIG. 1 illustrates three different configurations for a fiber optic connection system. Options 1 and 3 are configurations of the prior art, while option 2 is the configuration of the present invention. FIG. 1 shows the forces that exist due to the latching configuration utilized. The loops represent the circle of force and how it is distributed in the system, while the bold arrow identifies whether or not a forward force will be applied to the backplane after mating. Note that only in the configuration of option 1, is there a forward force applied to the backplane after mating. Latches are solidly colored for easier identification.

Option 1 shows a prior art daughter card fiber optic connector that is rigidly held to the backplane by external cam latches or card screw mounted in the enclosure. This configuration is utilized, for example, by 3M's OGI backplane connector. In this configuration, the force is distributed throughout the daughter card and is putting pressure on the retention means (e.g., latch or screws) in an attempt to force the daughter card back out of the system. Float in the axis of engagement is provided by springs loaded to an adapter (not shown) attached to the connector. This option is viable when the daughter card is relatively small (and forces on the system are relatively low). However, option 1 has disadvantages that make this option undesirable in many circumstances. For example, when the daughter card is no longer small, forces distributed over such distance would be difficult to control and predict. Also, when many ferrules are required for each connector, the force required increases and is multiplied by the number of daughter cards. Further, this configuration does not lend itself to a wide variety of system configurations.

Option 3 shows a prior art daughter card fiber optic connector in which the forces are removed from the backplane once the system is fully engaged. This configuration is desirable from the standpoint that because the force on the backplane has been removed, there is eliminated the potential for fatigue in the system or stresses which may damage electrical components. In this latching configuration, the side latches, typically made of plastic, retain the two assembly halves together, and allow the connector on either the daughter card or the backplane to float in the Z-direction (axis of engagement). U.S. Pat. No. 5,121,454 issued to Iwano et al. and Diamond GmbH's E-2000 connector, for example, utilize this form of latching.

As described above in the Background section, the fiber optic connector of option 3 is undesirable from the standpoint that it lacks design flexibility and uses up valuable space on a printed circuit board.

The fiber optic connector configuration shown in option 2, which is the preferred embodiment of the present invention, utilizes separable wafer modules. In addition, the configuration of option 2 preferably utilizes separable latching modules. This approach provides an opportunity for stackable components, which act as modular building blocks. Modular latching provides an ability to distribute forces within a system as desired. By simply adding another latching module into the connector assembly, loads can be distributed over a greater surface area and thus, minimize the force on any given latching module. Further, metallic materials may be used if desired to encapsulate the connector, thereby improving the overall system's shielding and durability. And by employing separable wafer modules, custom designs can be configured without specialty tooling and assembly equipment, thereby providing a vehicle for fast, cost-effective manufacturing cycles and scalability. It should be noted that the position of the latching modules shown in option 2 is solely for illustrative purposes and is in no way intended to limit the scope of the present invention to the configuration shown therein.

Figure 2:
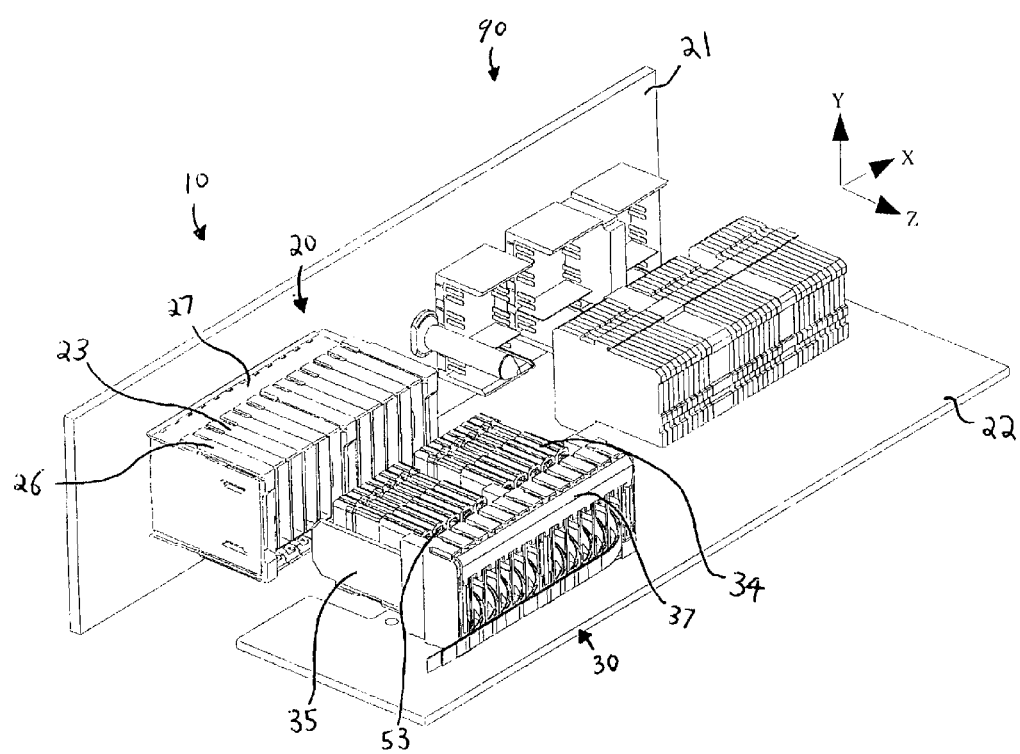
FIG. 2 is a perspective view showing an embodiment of a modular fiber optic connection system (in unmated position) of option 2 of FIG. 1, along with an electrical connection system (in unmated position)

FIG. 2 is a perspective view showing an embodiment of a modular fiber optic connection system configuration (in unmated position) of option 2 of FIG. 1, generally shown by reference numeral 10, along with an electrical connection system (in unmated position), generally shown by reference numeral 90. Fiber optic connectors of the fiber optic connection system 10 and electrical connectors of the electrical connection system 90 are attached to first and second printed circuit boards ("PCB") 21 and 22. As will become apparent to one of ordinary skill in the art from the discussion below, the objects of the present invention may be achieved with one, two or more fiber optic connectors attached to each PCB 21, 22.

In FIG. 2, the first PCB 21 is a backplane and the second PCB 22 is a daughter card. Fiber optic connector 20 includes separable wafer modules 23, separable latching modules 26, and a module carrier 27, preferably a stiffening member, which holds the wafer modules 23 and the latching modules 26. Fiber optic connector 30 includes separable wafer modules 34, separable latching modules 35, and a module carrier 37, preferably a stiffening member, which holds the wafer modules 34 and the latching modules 35. Carrier 27 is preferably made of metal and has slots (not numbered) for receiving the wafer modules 23 and the latching modules 26. In order to provide complete modularity, the slots of the carrier 27 can preferably receive either a wafer module 23 or a latching module 26. This requires the wafer module 23 and the latching module 26 to be similarly sized. Likewise, carrier 37 is preferably made of metal and has slots (not numbered) for receiving the wafer modules 34 and the latching modules 35. In order to provide complete modularity, the slots of the carrier 37 can preferably receive either a wafer module 34 or a latching module 35. This requires the wafer module 34 and the latching module 35 to be similarly sized.

While latching modules 26 are shown with fiber optic connector 20 and the latching modules 35 are shown with fiber optic connector 30, it should be apparent to one of ordinary skill in the art that the location of the modules 26, 35 may be exchanged without deviating from the function or objectives of the present invention. The design of the fiber optic connectors 20, 30 allows for modularity because the wafers are similarly sized. This means that accommodating different system configurations or density requirements can be achieved by selecting a suitable stiffening member and number of wafers as desired. Note that the latching modules 26, 35 are also modular, so the number of such modules incorporated and the location of such modules on the fiber optic connectors can be varied.

When the fiber optic connector 20 begins to mate with the fiber optic connector 30, alignment portions of the latching modules 26, 35 engage to guide the fiber optic connectors 20, 30 into desired mating position. As the fiber optic connectors 20, 30 are brought closer together, the wafer modules 23, 34 engage to provide optical communication, and engagement portions of the latching modules 26, 35 engage to mate the fiber optic connectors 20, 30.

Figure 3:
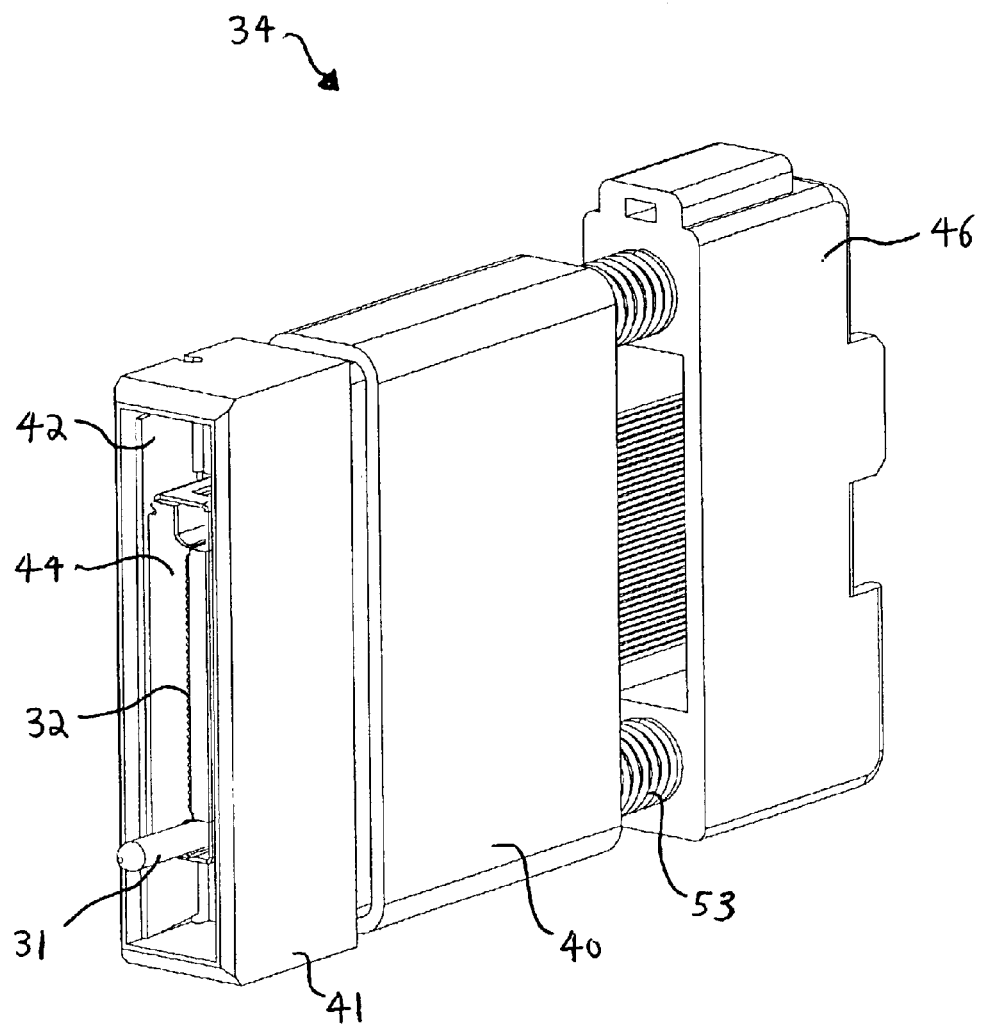
FIG. 3 shows one of the plurality of wafer modules (with shroud door in an open position) of the daughter card connector of the fiber optic connection system of FIG. 2.

Referring now to FIG. 3, there is shown one of the plurality of wafer modules 34 of the fiber optic connector 30 of the fiber optic connection system 10 of FIG. 2. As described above, while FIG. 2 shows the plurality of wafer modules 34 being identical to one another, it is only necessary for purposes of achieving modularity that each of the wafer modules 34 be similar in size. Therefore, for example, some of the wafer modules 34 can support a single optical fiber ferrule while other of the wafer modules 34 can support a multi-fiber ferrule.

The wafer module 34 illustrated in FIG. 3 includes a support frame 46, a body 40 and a retractable shroud 41. The support frame 46 is configured to be attachable to the carrier 37, 37a. The retractable shroud 41 has a door 42 that opens to expose a ferrule 44 holding one or more optical fibers 32. FIG. 3 shows the door 42 in open position.

The ferrule 44 may be one of the commercially available ferrules, such as, for example, the MT ("Mechanical Transfer") ferrule developed by Nippon Telegraph and Telephone Corporation or the MAC ("Multifiber Array Connector") ferrule developed by AT&T, or the ferrule disclosed in the concurrently filed non-provisional patent application entitled "Optical Connector Ferrule Designed To Minimize Manufacturing Imperfections And Mating Misalignments By Incorporating Exact Constraint Principles" (which is incorporated by reference herein), or any other ferrules that can be incorporated into the wafer design as described herein. The ferrule 44 shown in FIG. 3 is a multi-fiber ferrule, but it should be apparent to one of ordinary skill in the art that the wafer design of the present invention can be utilized for a single-fiber ferrule, as well as any number of multiple-fiber or single-fiber ferrules. The wafer module 34 further includes an alignment pin 31 used to guide and align during mating of the ferrule 44 to a corresponding ferrule of wafer module 23 of the fiber optic connector 20.

In the embodiment of the fiber optic connection system of FIGS. 2 and 3, float in the axis of engagement (Z-axis) is provided by biasing members (only a pair of biasing members 53 are visible in the drawings) that are provided with the wafer module 34. And throughout the float, wafer modules 23, 34 remain in optical communication. A detailed discussion of the operation of the biasing members of the wafer module 34 to provide Z-float can be found in a related application entitled "Waferized Fiber Optic Connector", which is concurrently filed with the present application and which is incorporated by reference herein. It should be apparent to one of ordinary skill in the art that because of the modularity provided by the fiber optic connection system of FIGS. 2 and 3, the fiber optic connection system of the present invention is not limited in its configuration by the number of separable wafer modules, number of separable latching modules, number of optical fibers required or other such considerations.

Figure 4:
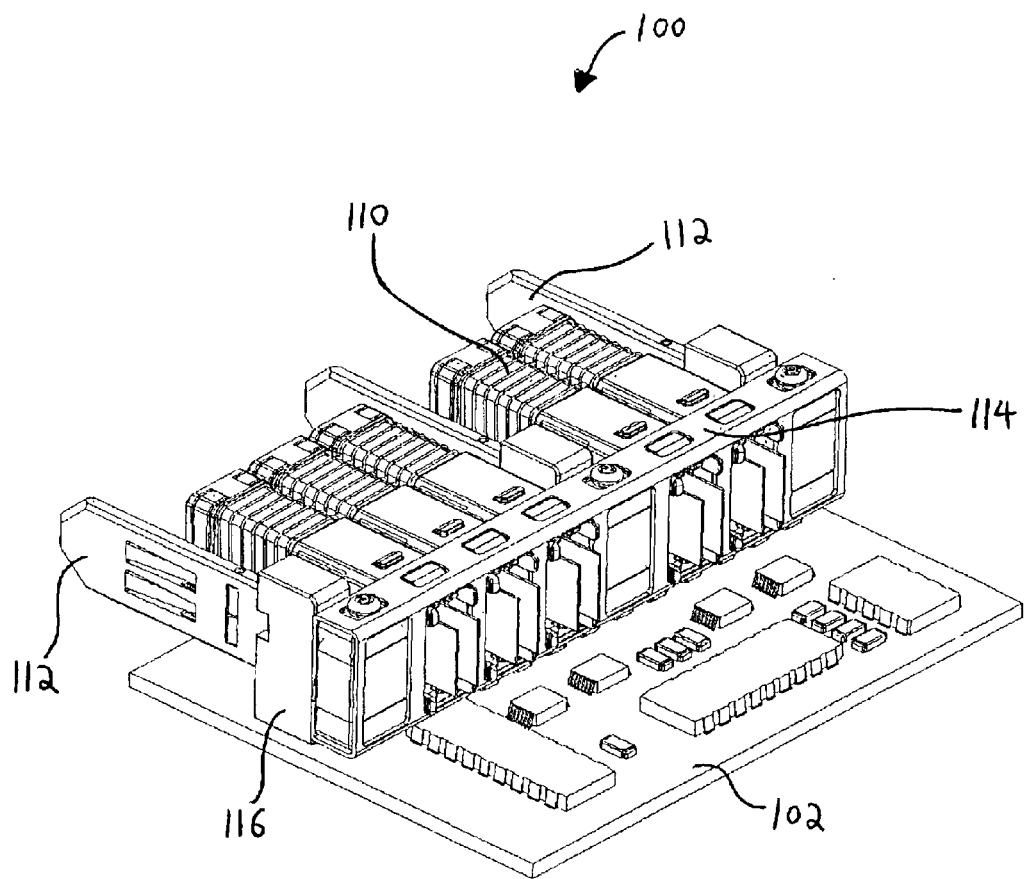
FIG. 4 is a perspective view showing a preferred embodiment of a modular fiber optic connector of option 2 of FIG. 1.

Referring now to FIG. 4, there is shown a perspective view of the preferred embodiment of a modular fiber optic connector of option 2 of FIG. 1. The fiber optic connector 100 includes separable wafer modules 110 and separable latching modules 112. A carrier 114 is preferably made of metal and has slots (not numbered) for receiving the wafer modules 110 and the latching modules 112. In order to provide complete modularity, the slots of the carrier 114 can preferably receive either a wafer module 110 or a latching module 112. This requires the wafer module 110 and the latching module 112 to be similarly sized.

In the embodiment of the fiber optic connector 100 shown in FIG. 4, a printed circuit board 102, which is a daughter card as shown, includes module support members 116 attached thereto. Each module support member 116 includes an opening 258 (see FIG. 6A) which slidably engages a latching module 112. By configuring the module support members 116 accordingly, the wafer modules 110 and the latching modules 112 attached to the carrier 114 can be spaced apart from the printed circuit board 102 at a desired distance. And this provides the advantage of making available this space between the fiber optic connector 100 and the printed circuit board 102 for use by other components.

It should be noted that while FIG. 4 shows the wafer modules 110 being identical to one another, it is only necessary for purposes of achieving modularity that each of the wafer modules 110 be similar in size. Thus, for example, some of the wafer modules 110 can support optical fibers in cable while other of the wafer modules 110 can support ribbonized optical fibers. Also, as discussed in greater detail below with respect to FIGS. 6A and 6B, float in the axis of engagement (Z-axis) is provided by the operation of the latching modules 112 and corresponding latching modules on the mating connector. Wafer modules on the mating connector are preferably identical to the wafer modules 10 on the connector 100 to which they mate. It should be apparent to one of ordinary skill in the art that because of the modularity provided by the fiber optic connector of FIG. 4, the fiber optic connector of the present invention is not limited in its configuration by the number of separable wafer modules, number of separable latching modules, number of optical fibers required or other such considerations.

Figure 5:
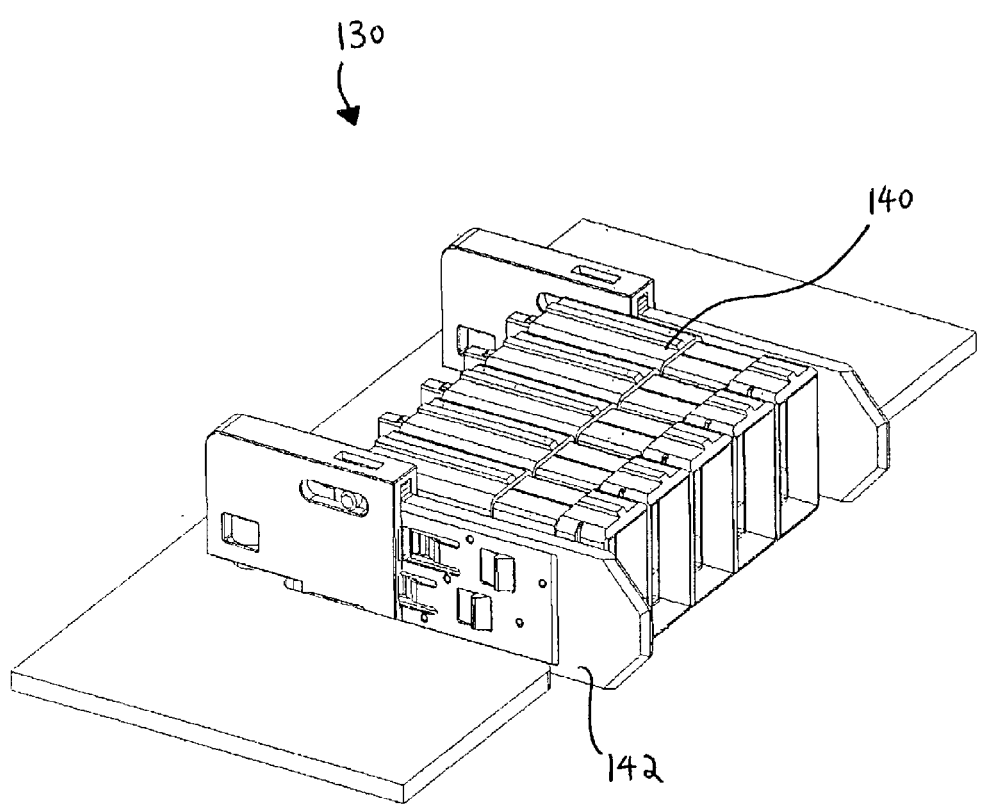
FIG. 5 is a perspective view showing an alternative embodiment of a modular fiber optic connector of FIG. 4, where the connector of this embodiment does not utilize a carrier.

FIG. 5 is a perspective view showing an alternative embodiment of a modular fiber optic connector of FIG. 4, where the connector of this embodiment does not utilize a carrier. The fiber optic connector 130 includes separable wafer modules 140 and separable latching modules 142. Unlike the previous embodiments which utilize a carrier, for the fiber optic connector 130 of FIG. 5, the separable wafer modules 140 and the separable latching modules 142 are attached to one another by pins or the like which extend through the length of the assembly. Note that the operation of the latching modules 142 is similar to the operation of the latching modules 112 of FIG. 4, and the Z-axis float is provided by the operation of the latching modules 142 and corresponding latching modules on the mating connector.

Figure 6A:
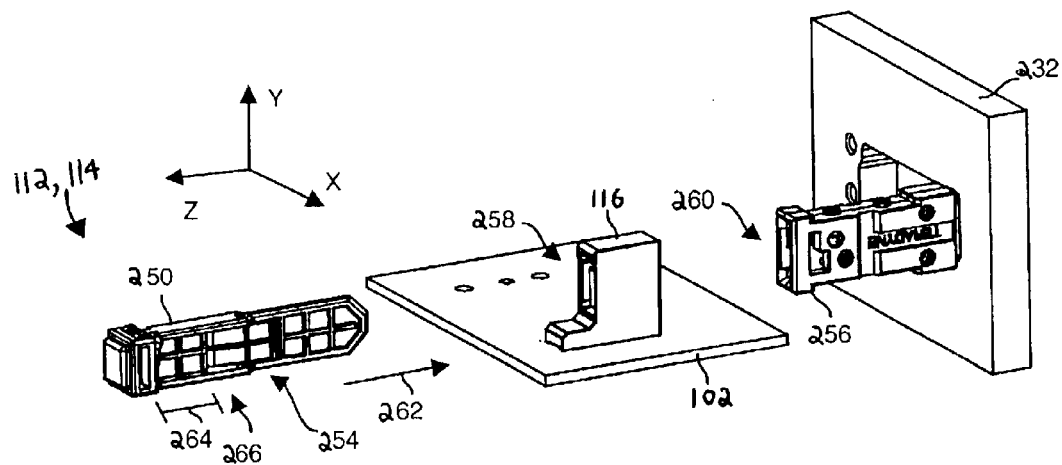
FIG. 6A shows a perspective view of a separable latching module of FIGS. 4 and 5, along with a corresponding latching module on a mating printed circuit board, in an unlatched state.

FIG. 6A shows a perspective view of the separable latching module 112, 114 of FIGS. 4 and 5 along with a corresponding latching module 256 (also referred to herein as "receptacle member") on a printed circuit board 232, which is shown as a backplane. The separable latching module 112, 114 includes a guide member 250 and a control assembly 254 which integrates with the guide member 250. The guide member 250 is configured to (i) slidably engage with the module support member 116 attached to the daughter card 102 and (ii) selectively engage and disengage with the receptacle member 256. Accordingly, when the module support member 116 is attached to the daughter card 102 and when the receptacle member 256 is attached to the backplane 232, the guide member 250 can latch the daughter card 102 to the backplane 232 by engaging and locking with the receptacle member 256. Such engaging and locking occurs when the guide member 250 is initially loaded through the opening 258 defined by the module support member 116, and then moved along the Z-axis in the direction indicated by arrow 262 toward an opening 260 defined by the receptacle member 256.

Figure 6B:
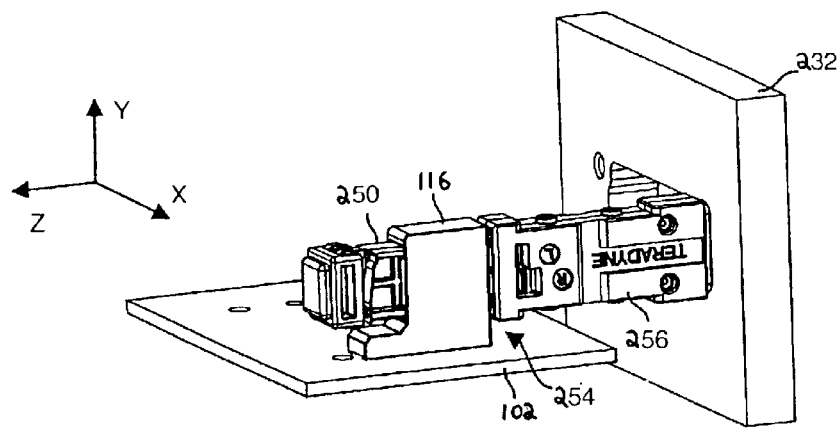
FIG. 6B shows a perspective view of the latching modules of FIG. 6A in a latched state.

FIG. 6B shows the guide member 250 engaged with and locked to the receptacle member 256. Accordingly, the daughter card 102 is now considered latched to the backplane 232. In this situation, the guide member 250 is held rigidly by the receptacle member 256. Thus, any connecting elements rigidly attached to the guide member 250 and the receptacle member 256 can connect in a robust and healthy manner. However, the guide member 250 is only loosely connected to the module support member 116 in that there is Z-direction freedom of movement available.

The control assembly 254 is configured to retain the module support member 116 within a retaining range 264 of the guide member 250 when the guide member 250 is unlocked from the receptacle member 256. Such retention prevents the guide member 250 from inadvertently escaping from the module support member 116 prior to latching and during the latching process. Additionally, the control member 254 is further configured to un-restrict the module support member 116 such that the module support member 116 is movable outside of the retaining range 264 of the guide member 250 (i.e., movable to a location 266 outside the retaining range 264) when the guide member 250 is locked with the receptacle member 256. It is this operation that provides for the desired float in the Z-axis.

A detailed discussion of the operation of the latching modules of FIGS. 4–6B to provide Z-float can be found in a related application entitled "Techniques For Connecting A Set Of Connecting Elements Using An Improved Latching Apparatus", which is concurrently filed with the present application and which is incorporated by reference herein. It should be apparent to one of ordinary skill in the art that because of the modularity provided by the fiber optic connection system of FIGS. 4 and 5, the fiber optic connection system of the present invention is not limited in its configuration by the number of separable wafer modules, number of separable latching modules, number of optical fibers required or other such considerations.

Figure 7:
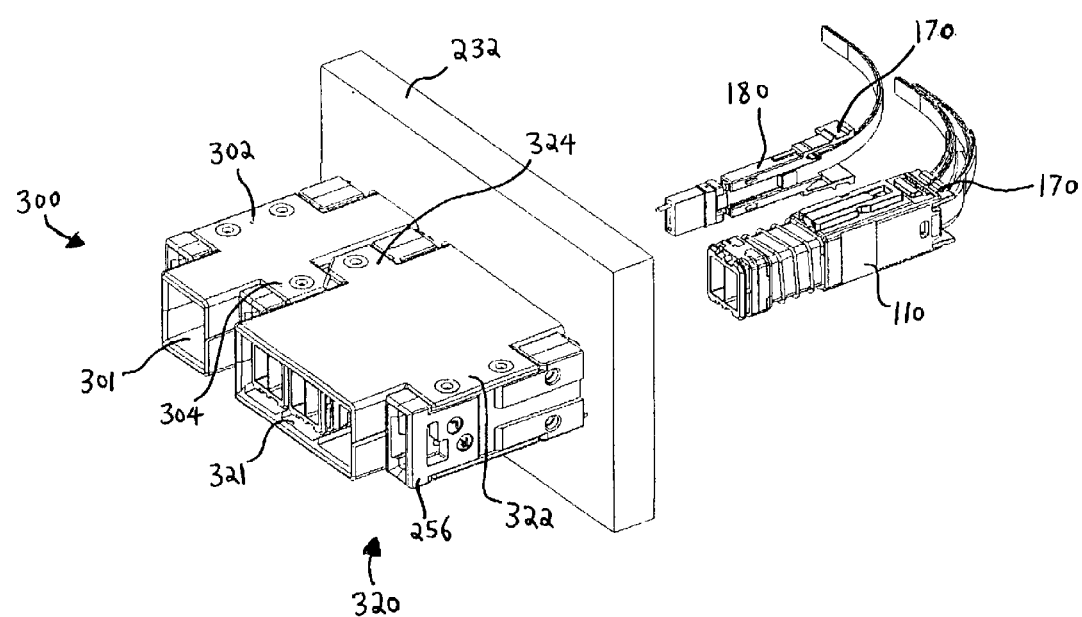
FIG. 7 shows an alternate embodiment of a carrier design for separable wafer modules and latching modules, where the carrier is designed to provide easy addition/removal of the wafer modules.
Figure 8:
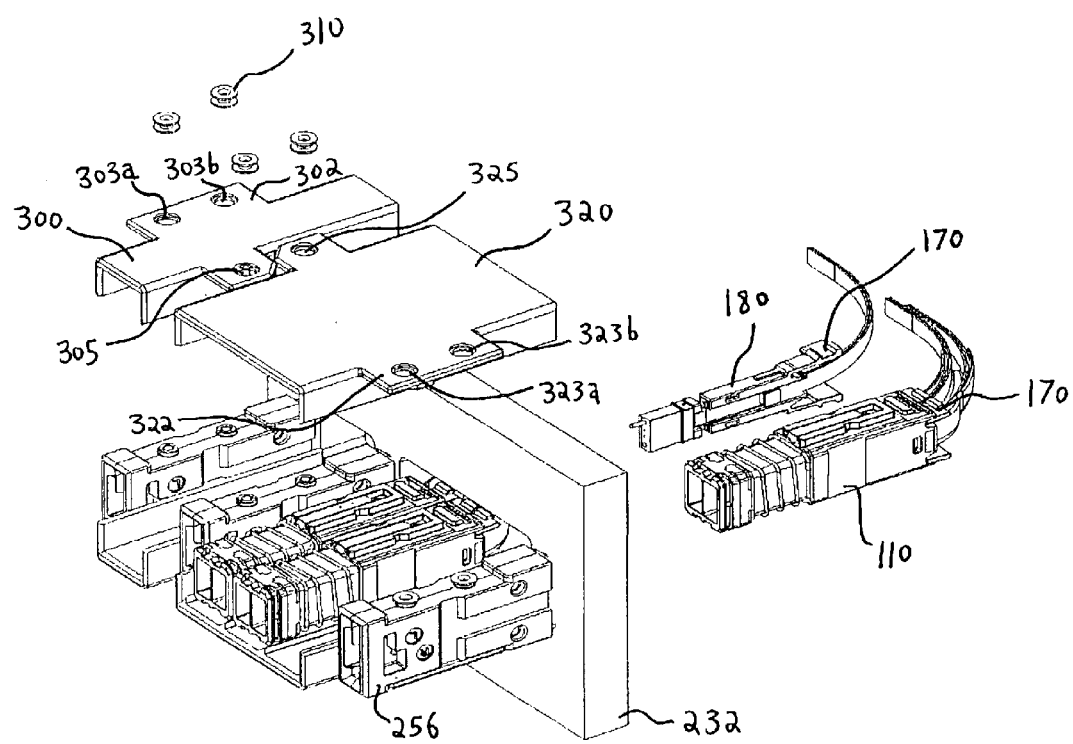
FIG. 8 is an exploded view of FIG. 7 (with top half of the carrier design set apart from the assembly), intended to more clearly show the carrier for the modules.

Referring now to FIGS. 7 and 8, there are shown an alternate embodiment of a carrier design for separable wafer modules and latching modules, where the carrier is designed to provide easy addition/removal of the wafer modules. The carriers, which are generally shown by reference numerals 300 and 320, can hold the separable wafer modules and latching modules of FIG. 2, or the separable wafer modules and latching modules of FIGS. 4–6B. In FIGS. 7 and 8, the carriers 300, 320 preferably hold the wafer modules 110 and the latching modules 256 of the backplane 232.

The carrier 300 is shown having an opening 301 for receiving a separable wafer module 110. The carrier 300 also includes a first tab 302 having first and second apertures 303a, 303b and a second tab 304 having an aperture 305. The carrier 320 is shown having an opening 321 with slots provided therein to receive three separable wafer modules 110. The carrier 320 also includes a first tab 322 having first and second apertures 323a, 323b and a second tab 324 having an aperture 325.

Latching modules 256 are provided with engagement means configured to engage the apertures 303a, 303b, 305, 325, 323a, 323b in the tabs of the carriers 300, 320 to attach the latching modules to the carriers. For example, the engagement means may be protrusions which, in FIG. 8, are attached by rivets 310 or the like. Preferably, each latching module 256 has two protrusions corresponding to the two apertures available for each latching module. However, it should be apparent to one of ordinary skill in the art that any number of apertures and protrusions may be available for the carrier and latching module, respectively, without departing from the scope of the present invention.

The second tab 304 of the carrier 300 and the second tab 324 of the carrier 320 are preferably positioned adjacent one another when the carriers are attached to the backplane 232 such that a separable latching module 256 may be attached between the carriers 300, 320 without wasting backplane space. Another advantage of the carriers 300, 320 is the simplicity in adding/removing any of the separable wafer modules 110 from the carriers. This can be accomplished, for example, by providing an actuable mechanism (not shown) on the carriers 300, 320. The separable wafer modules 110 can also be provided with separable ferrule assemblies 180, which may utilize actuable clips 170 or the like, for engaging/disengaging the ferrule assembly from the wafer module housing.

By providing a limited number of carriers of the present invention with openings configured for different numbers of separable wafer modules (for example, providing carriers for holding 2, 3 and 4 wafer modules), the fiber optic connection system of the present invention can be made to accommodate a wide variety of system configurations without the expenses associated with the prior art.

Having described the preferred embodiment and alternative embodiments of the invention in sufficient detail to enable those skilled in the art to make and use the invention, it will nevertheless be appreciated that variations and modifications to the described embodiments may be made without departing from the spirit and scope of the invention, and it is intended that the invention not be limited to the above description or accompanying drawings, but that it be defined in accordance with the following claims.

What is claimed is:

1. A fiber optic connection system comprising:
   a first fiber optic connector attachable to a first printed circuit board, the first fiber optic connector including:
      a first separable module holding at least one optical fiber;
      a second separable module removably attached to the first separable module, the second separable module having an alignment portion and an engagement portion;
   a second fiber optic connector attachable to a second printed circuit board, the second fiber optic connector being mateable to the first fiber optic connector and including:
      a third separable module holding at least one optical fiber;
      a fourth separable module removably attached to the third separable module, the fourth separable module having an alignment portion and an engagement portion;
   the alignment portions of the second and fourth separable modules engaging when the first and second fiber optic connectors begin to mate to guide the first and second fiber optic connectors into desired mating position; and
   the first separable module coupling to the third separable module to provide optical communication, and the engagement portions of the second and fourth separable modules engaging to mate the first and second fiber optic connectors.

2. The fiber optic connection system of claim 1, wherein the first fiber optic connector further comprises a second separable module support member attached to the first printed circuit board, the second separable module support member slidably engaging the second separable module and providing space between the first and second separable modules and the first printed circuit board such that components may be attached to the first printed circuit board in the space therebetween.

3. The fiber optic connection system of claim 1, wherein the second and fourth separable modules provide float in axis of engagement when the engagement portions are engaged, and the first and third separable modules remain in optical communication throughout the float.

4. The fiber optic connection system of claim 1, wherein the third separable module comprises a biasing member to provide float in axis of engagement when the engagement portions of the second and fourth separable modules are engaged, and the first and third separable modules remain in optical communication throughout the float.

5. A fiber optic connector comprising:
   a module carrier, the module carrier having module receiving openings;
   at least one separable wafer module holding at least one optical fiber, the separable wafer module receivable by and attachable to one of the module receiving openings of the module carrier the separable wafer module having a mating interface adapted to mate to a second fiber optic connector; and
   at least one separable latching module to engage the fiber optic connector with a the second fiber optic connector, the separable latching module receivable by and attachable to one of the module receiving openings of the module carrier, and the separable latching module comprising an alignment portion projecting away from the module carrier beyond the mating interface of the separable wafer module.

6. The fiber optic connector of claim 5, wherein the at least one separable latching module comprises at least three separable latching modules.

7. The fiber optic connector of claim 5, wherein each of the at least one separable wafer module comprises at least one fiber optic ferrule and each of the at least one separable latching modules does not comprise a fiber optic ferrule.

8. The fiber optic connector of claim 5, additionally comprising a circuit board to which the fiber optic is mounted to form a subassembly, wherein:
   a) the circuit board has a forward edge; and
   b) the fiber optic connector is mounted with the portion of each of the separable latching module extending beyond the forward edge.

9. The subassembly of claim 8, additionally comprising electronic components attached to the circuit board.

10. A fiber optic connection system comprising:
    a first fiber optic connector attachable to a first printed circuit board, the first fiber optic connector including:
       separable first wafer modules, each of the separable first wafer modules holding at least one optical fiber; and
       separable first latching modules removably attached to the separable first wafer modules;
    a second fiber optic connector attachable to a second printed circuit board, the second fiber optic connector being mateable to the first fiber optic connector and including:
       separable second wafer modules, each of the separable second wafer modules holding at least one optical fiber; and
       separable second latching modules removably attached to the separable second wafer modules, the separable second latching modules engageable to the separable first latching modules to latch the first and second fiber optic connectors.

11. The fiber optic connection system of claim 6, further comprising:

a first module carrier having module receiving openings for receiving the separable first wafer modules and the separable first latching modules; and a second module carrier having module receiving openings for receiving the separable second wafer modules and the separable second latching modules.

12. The fiber optic connection system of claim 7, wherein at least one of the first and second module carriers is a metal stiffener.

13. The fiber optic connection system of claim 6, wherein the first fiber optic connector further comprises first latching module support members attached to the first printed circuit board, the first latching module support members slidably engaging the first latching modules and providing space between the first wafer modules and latching modules and the first printed circuit board such that components may be attached to the first printed circuit board in the space therebetween.

14. The fiber optic connection system of claim 6, wherein the first and second latching modules provide float in axis of engagement when engaged, and the first and second wafer modules remain in optical communication throughout the float.

15. The fiber optic connection system of claim 6, wherein each of the second latching modules comprises a biasing member to provide float in axis of engagement when the first and second latching modules are engaged, and the first and second wafer modules remain in optical communication throughout the float.

16. A fiber optic connection system comprising:
a first printed circuit board;
a first fiber optic connector attached to the first printed circuit board, the first fiber optic connector including:
 a first module carrier, the first module carrier having module receiving openings;
 at least one separable first wafer module holding at least one optical fiber, the separable first wafer module receivable by and attachable to one of the module receiving openings of the first module carrier;
 at least one separable first latching module, the separable first latching module receivable by and attachable to one of the module receiving openings of the first module carrier; and
a second printed circuit board;
a second fiber optic connector attached to the second printed circuit board, the second fiber optic connector including:
 a second module carrier, the second module carrier having module receiving openings;
 at least one separable second wafer module holding at least one optical fiber, the separable second wafer module receivable by and attachable to one of the module receiving openings of the second module carrier;
 at least one separable second latching module engageable to the first latching module of the first fiber optic connector, the separable second latching module receivable by and attachable to one of the module receiving openings of the second module carrier, and the separable first latching module having first latching features; and
a second printed circuit board;
a second fiber optic connector attached to the second printed circuit board, the second fiber optic connector including:
a second module carrier, the second module carrier having module receiving openings;
at least one separable second wafer module holding at least one optical fiber, the separable second wafer module receivable by and attachable to one of the module receiving openings of the second module carrier;
at least one separable second latching module, the separable second latching module having second latching features latchable to the first latching features of the first fiber optic connector, the separable second latching module receivable by and attachable to one of the module receiving openings of the second module carrier.

17. A fiber optic connector comprising:
at least one separable wafer module having an actuable engaging member, the separable wafer module holding at least one optical fiber;
at least one separable latching module to latch the fiber optic connector to a corresponding mating fiber optic connector;
a module carrier having module receiving openings with each of the module receiving openings being similarly sized, the wafer module receivable by and attachable to any one of the module receiving openings and the latching module receivable by and attachable to any one of the module receiving openings; and
the actuable engaging member of the separable wafer module engageable to the module carrier to removably attach the wafer module to the module carrier.

18. The fiber optic connector of claim 17, wherein the module carrier includes a first attachment portion and a second attachment portion to which is attachable the latching module.

19. The fiber optic connector of claim 18, wherein the at least one separable wafer module comprises a mating face and the latching module includes at least one protrusion extending beyond the mating face.

20. The fiber optic connector of claim 18, wherein the module carrier defines an opening positioned between the first attachment portion and the second attachment portion for receiving the wafer module.

* * * * *